United States Patent
Toda

(10) Patent No.: US 12,311,624 B2
(45) Date of Patent: May 27, 2025

(54) MOLDING DRUM

(71) Applicant: Toyo Tire Corporation, Itami (JP)

(72) Inventor: Tatsuya Toda, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 18/228,069

(22) Filed: Jul. 31, 2023

(65) Prior Publication Data

US 2024/0092044 A1    Mar. 21, 2024

(30) Foreign Application Priority Data

Sep. 21, 2022   (JP) .................. 2022-150339

(51) Int. Cl.
*B29D 30/26* (2006.01)

(52) U.S. Cl.
CPC ...... *B29D 30/26* (2013.01); *B29D 2030/2657* (2013.01)

(58) Field of Classification Search
CPC ........ B29D 30/08; B29D 30/12; B29D 30/16; B29D 30/1607; B29D 30/24; B29D 30/26; B29D 30/30; B29D 30/3007; B29D 30/3042; B29D 30/305; B29D 2030/1664; B29D 2030/2642; B29D 2030/265; B29D 2030/2657; B29D 2030/2671; B29D 2030/2685; B29D 2030/3064; B29D 2030/427
USPC ........................................ 156/414, 415, 417
See application file for complete search history.

(56) References Cited

U.S. PATENT DOCUMENTS

| | | | | |
|---|---|---|---|---|
| 4,078,739 A | * | 3/1978 | Noe ...................... | B21C 47/323 242/586.4 |
| 5,073,226 A | * | 12/1991 | Suzuki ................. | B29D 30/242 156/134 |
| 2015/0083301 A1 | | 3/2015 | Fischer et al. | |
| 2023/0311439 A1 | * | 10/2023 | Ten Wolde ............ | B29D 30/26 156/123 |

FOREIGN PATENT DOCUMENTS

| | | | |
|---|---|---|---|
| DE | 3600187 C2 | * | 4/1990 |
| JP | 2006264049 A | * | 10/2006 |
| JP | 2015-536844 A | | 12/2015 |

OTHER PUBLICATIONS

Matsuda H, DE-3600187-C2, machine translation. (Year: 1990).*
Narita Y, JP-2006264049-A, machine translation. (Year: 2006).*

* cited by examiner

*Primary Examiner* — Sedef E Paquette
(74) *Attorney, Agent, or Firm* — WHDA, LLP

(57) ABSTRACT

A molding drum is provided in which a sheet-shaped rubber member for a tire is wound around an outer circumferential surface having a cylindrical shape. A plurality of segments are arranged in a drum circumferential direction, and the outer circumferential surface of the molding drum is formed by outer surfaces of the segments coinciding with each other. At least one of the plurality of segments is a tip-end holding segment including at least a first small segment and a second small segment that serve as small segments arranged in the drum circumferential direction. The first small segment can take a first state in which an outer surface of the first small segment coincides with an outer surface of the second small segment, and a second state in which at least a portion of the first small segment is disposed outward of the second small segment in a drum radial direction.

1 Claim, 20 Drawing Sheets

MOLDING DRUM

CROSS-REFERENCE TO RELATED APPLICATIONS

This application claims the benefit of and priority to Japanese Patent Application No. 2022-150339 filed on Sep. 21, 2022, and the content thereof is incorporated herein by reference in its entirety.

BACKGROUND OF THE INVENTION

1. Field of the Invention

The present invention relates to a molding drum.

2. Description of Related Art

In manufacturing steps for a pneumatic tire, there is a step in which a sheet-shaped rubber member is wound around a molding drum and molded into a cylindrical shape. When the sheet-shaped rubber member starts to be wound around the molding drum, a tip end of the sheet-shaped rubber member is attached to a surface of the molding drum. The tip end of the sheet-shaped rubber member is attached to the surface of the molding drum with a certain degree of strength only by being in contact with the surface of the molding drum.

However, the tip end of the sheet-shaped rubber member may deviate on the surface of the molding drum. Adhesiveness of the sheet-shaped rubber member slightly changes depending on a lot or the like. When the adhesiveness is small, the sheet-shaped rubber member is particularly likely to deviate on the surface of the molding drum. If the tip end of the sheet-shaped rubber member is left in a deviated state, a completed tire is a defective product.

Therefore, as described in JP2015-536844A, it is proposed to provide a drum clamp on an outer side with respect to an outer circumferential surface of a drum in a drum radial direction. According to this proposal, the tip end of the member attached to the outer circumferential surface of the drum can be sandwiched between the outer circumferential surface of the drum and the drum clamp.

SUMMARY OF THE INVENTION

However, when the above-described drum clamp is present, a structure related to the drum clamp may also be complicated, and a size of an entire apparatus including the molding drum will be increased.

Therefore, an object of the invention is to provide a molding drum capable of preventing deviation of a tip end of a sheet-shaped rubber member without an increase in size.

The invention includes embodiments to be described below.

[1] A molding drum in which a sheet-shaped rubber member for a tire is wound around an outer circumferential surface having a cylindrical shape, in which a plurality of segments are arranged in a drum circumferential direction, and the outer circumferential surface of the molding drum is formed by outer surfaces of the segments coinciding with each other, at least one of the plurality of segments is a tip-end holding segment, the tip-end holding segment includes at least a first small segment and a second small segment that serve as small segments arranged in the drum circumferential direction, and the first small segment can take a first state in which an outer surface of the first small segment coincides with an outer surface of the second small segment, and a second state in which at least a portion of the first small segment is disposed outward of the second small segment in a drum radial direction.

[2] The molding drum according to [1], in which the tip-end holding segment is divided into the first small segment and the second small segment over an entire drum axial direction.

[3] The molding drum according to [1] or [2], in which a portion of the first small segment, which faces the outer surface of the second small segment when the first small segment takes the second state, is formed as a flexible portion.

[4] The molding drum according to any one of [1] to [3], in which a moving device configured to move the first small segment from the first state to the second state is disposed inward of the first small segment in the drum radial direction.

[5] The molding drum according to any one of [1] to [4], in which a first moving device configured to move the first small segment in the drum radial direction and a second moving device configured to move the first small segment, after being moved outward in the drum radial direction, toward the second small segment are provided as moving devices configured to move the first small segment from the first state to the second state.

Although a size of the above-described molding drum is not increased, it is possible to prevent deviation of the tip end of the sheet-shaped rubber member.

BRIEF DESCRIPTION OF THE DRAWINGS

FIG. 12 is a block diagram of a control unit and the like;

DESCRIPTION OF EMBODIMENTS

Embodiments will be described with reference to the drawings. The embodiments to be described below are merely examples, and modifications appropriately made within a range without departing from the gist of the invention are included in the scope of the invention.

Figure 1:
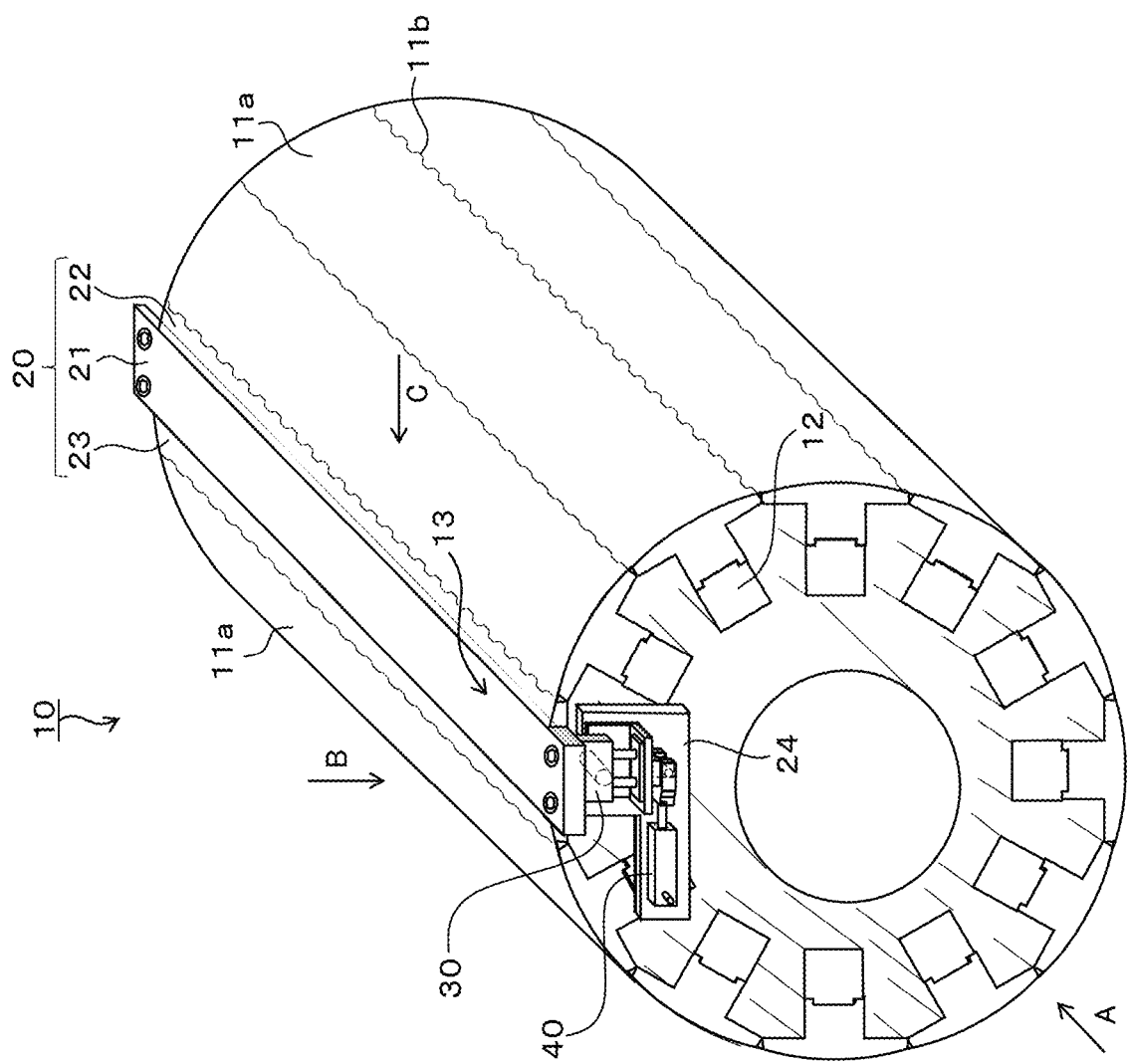
FIG. 1 is a perspective view of a molding drum when a diameter thereof is increased.
Figure 2:
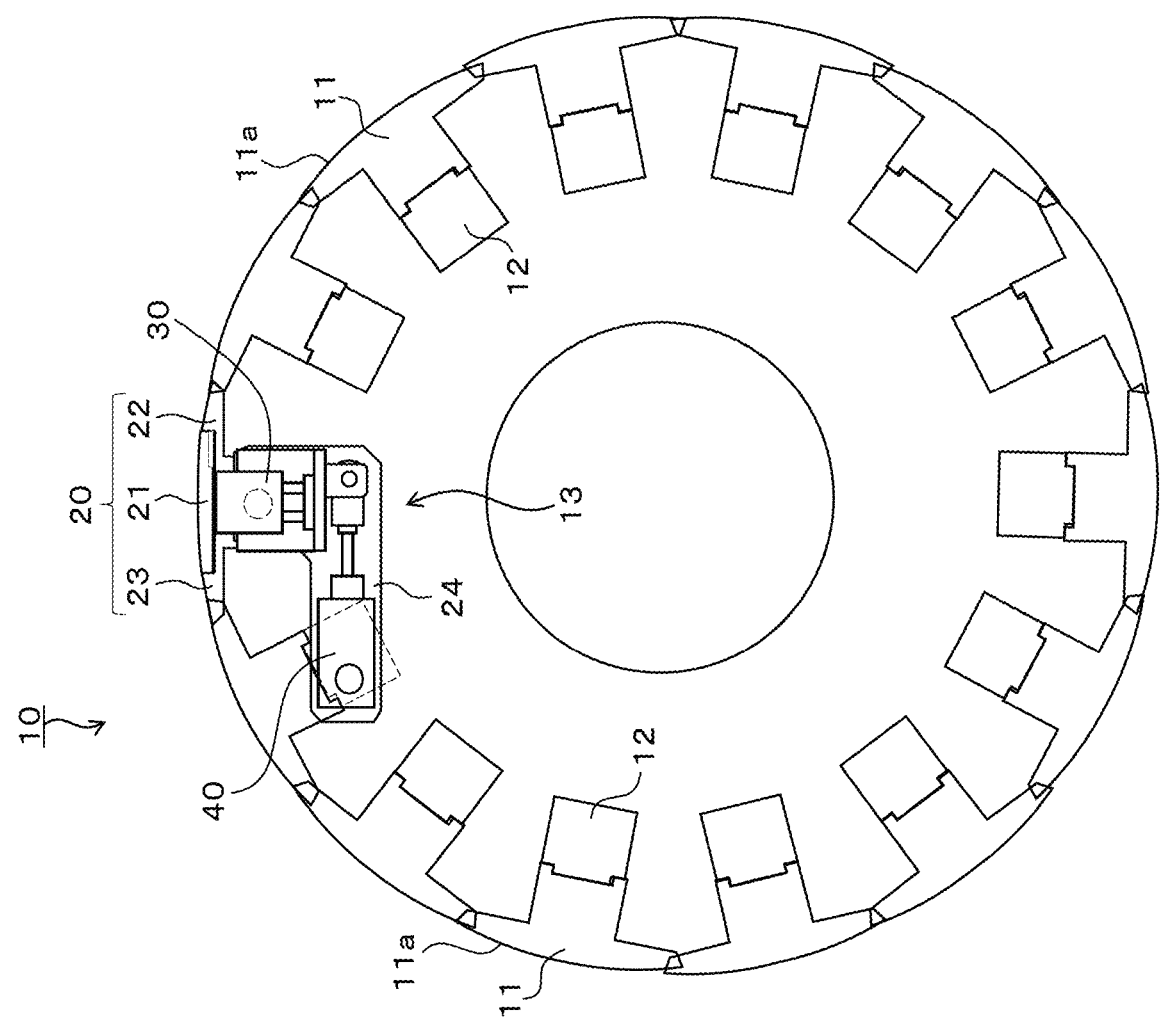
FIG. 2 is a view of the molding drum when the diameter thereof is increased as seen from a drum axial direction (a view as seen from a direction indicated by an arrow A in FIG. 1)

A molding drum 10 illustrated in FIGS. 1 and 2 is a drum for molding a cylindrical rubber member by winding a sheet-shaped rubber member around an outer circumferential surface of the molding drum 10. The sheet-shaped rubber member is a component of a pneumatic tire. The sheet-shaped rubber member is made of rubber, and may contain therein a material other than rubber such as a cord made of metal or organic fiber. The cylindrical rubber member molded from the sheet-shaped rubber member is a portion of the pneumatic tire.

As illustrated in FIGS. 1 and 2, the molding drum 10 is provided with a plurality of segments 11 arranged in a drum circumferential direction. The segments 11 are members elongated in a drum axial direction. A surface (hereinafter referred to as an "outer surface") on an outer side of each of the segments 11 in a drum radial direction is a curved surface. Outer surfaces 11a are portions of the outer circumferential surface of the molding drum 10. The outer circumferential surface of the molding drum 10 is one cylindrical surface forming an outer circumference of the molding drum 10, and serves as a molding surface during molding.

When viewed from the outer side in the drum radial direction, both ends of each of the segments 11 in the drum circumferential direction are formed with concave and convex portions 11b in which concave portions and convex portions are alternately disposed in a tire axial direction. The concave and convex portions 11b of the adjacent segments 11 mesh with each other.

The segments 11 are made of metal such as stainless steel. The outer surfaces 11a of the segments 11 are smooth surfaces made of metal.

The segments 11 are attached to an outer portion of a segment holding member 12 in the drum radial direction. The segment holding member 12 is disposed on an inner side of the segments 11 in the drum radial direction.

A known segment driving device 53 (see FIG. 12) including a cylinder or the like is provided inside the molding drum 10. The segment driving device 53 drives the segments 11, so that the segments 11 move in the drum radial direction.

The segments 11 move outward in the drum radial direction, so that the diameter of the molding drum 10 is increased. Increasing the diameter refers to an increase in diameter. FIGS. 1 and 2 are views when the diameter of the molding drum 10 is increased. As illustrated in FIGS. 1 and 2, when the diameter of the molding drum 10 is increased, the adjacent segments 11 come into contact with each other, and the outer surfaces 11a of all the segments 11 are integrated to form one cylindrical surface. In this state, the sheet-shaped rubber member is wound, and the cylindrical rubber member is molded.

Figure 3:
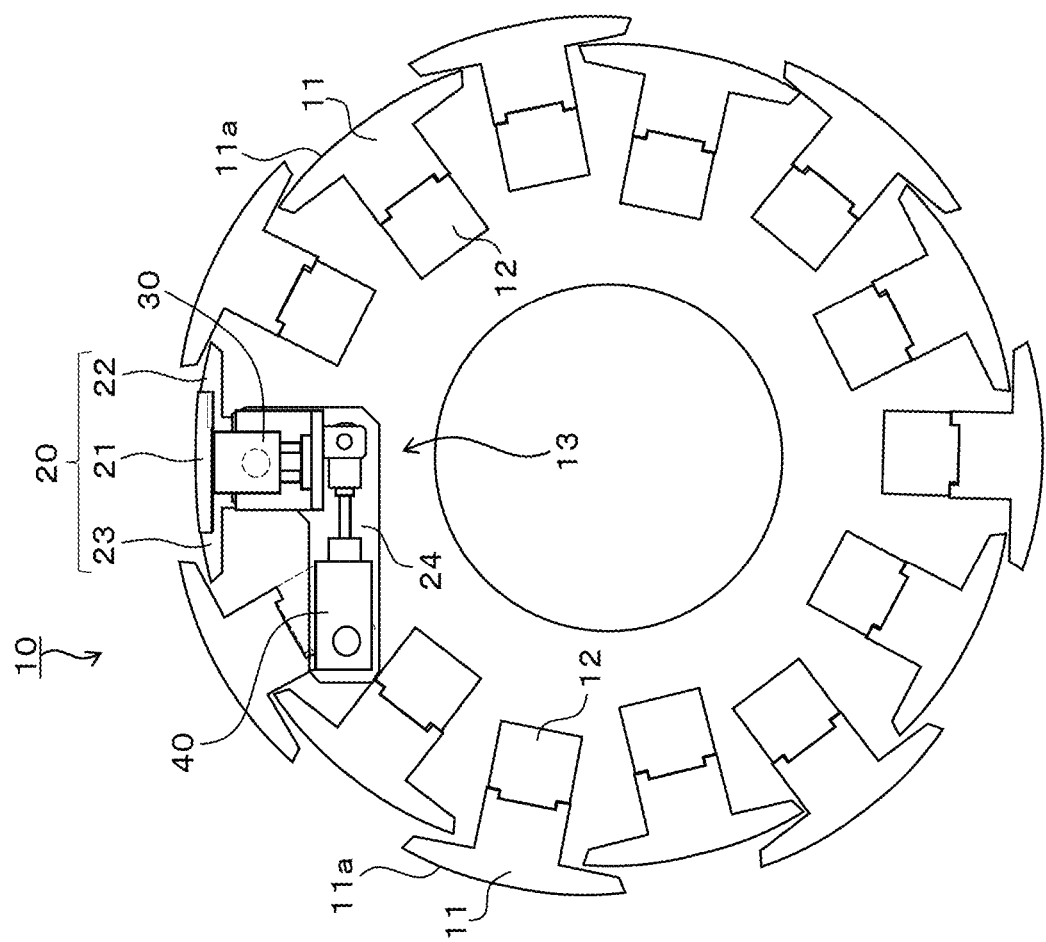
FIG. 3 is a view of the molding drum when the diameter thereof is reduced as seen from the drum axial direction.

FIG. 3 is a view when the diameter of the molding drum 10 is reduced. Reducing the diameter refers to a reduction in diameter. When the segment 11 moves inward in the drum radial direction, the diameter of the molding drum 10 is reduced as illustrated in FIG. 3. When the diameter of the molding drum 10 is reduced, the segment 11 after moving inward greatly in the drum radial direction and the segment 11 after moving inward modestly in the drum radial direction are alternately disposed in the drum circumferential direction. When the diameter of the molding drum 10 is reduced after the cylindrical rubber member is molded on the molding surface, a gap can be formed between the cylindrical rubber member and the outer surface 11a of the segment 11, and the cylindrical rubber member can be removed.

One of such segments 11 is replaced with a tip-end holding segment 20. The tip-end holding segment 20 is a portion of a tip-end holding device 13 that holds a tip end of the sheet-shaped rubber member. The tip end of the sheet-shaped rubber member is a portion at the beginning of winding of the sheet-shaped rubber member.

The tip-end holding segment 20 includes three small segments 21, 22, and 23. The three small segments 21, 22, and 23 are arranged in the drum circumferential direction. As the three small segments 21, 22, and 23, the first small segment 21 at a center in the drum circumferential direction, the second small segment 22 on one side in the drum circumferential direction, and the third small segment 23 on the other side in the drum circumferential direction are provided.

Figure 5:
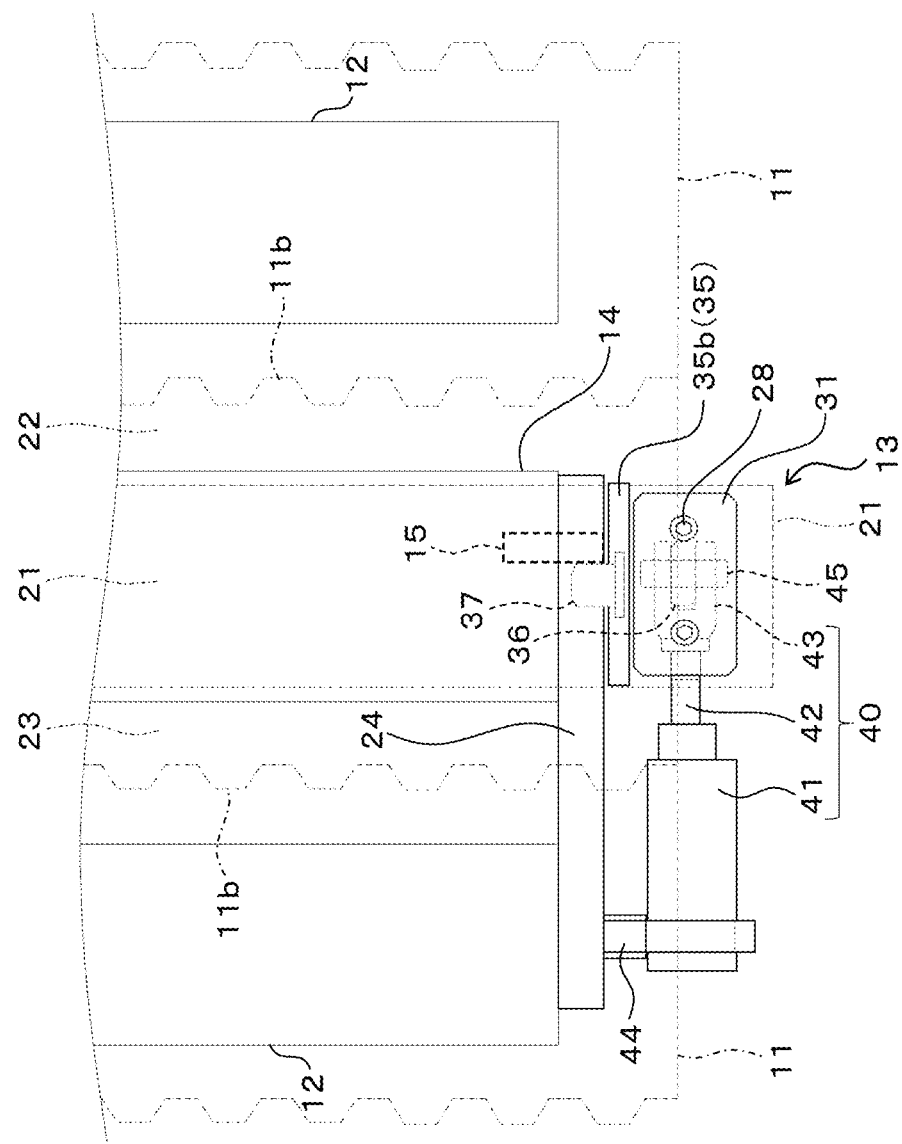
FIG. 5 is a view of a moving device as seen from an outer side in a drum radial direction (a view as seen from a direction indicated by an arrow B in FIG. 1), in which an upper-lower direction is the drum axial direction.

The second small segment 22 and the third small segment 23 have the same length as other segments 11 in the tire axial direction. On the other hand, a length of the first small segment 21 in the drum axial direction is larger than that of other segments 11. As illustrated in FIG. 5, each of portions of the first small segment 21 on both sides in the drum axial direction is a portion protruding outward of other segments 11 in the drum axial direction and held by a first moving device 30 to be described later.

The small segments 21, 22, and 23 are made of metal such as stainless steel. Outer surfaces 21a, 22a, and 23a (see FIG.

4 and the like) of the small segments 21, 22, and 23 are smooth surfaces made of metal. The outer surfaces 21a, 22a, and 23a of the small segments 21, 22, and 23 have the same surface roughness such as arithmetic average roughness Ra as that of the outer surfaces 11a of other segments 11.

A flexible portion 27 is formed at a position on a second small segment 22 side on an inner surface (hereinafter, the surface is referred to as a "back surface") of the first small segment 21 in the drum radial direction. The flexible portion 27 is provided at a position on the second small segment 22 side with respect to the center of the first small segment 21 in the drum circumferential direction. The flexible portion 27 includes an end portion of the first small segment 21 on the second small segment 22 side. A length of the flexible portion 27 in the drum axial direction preferably coincides with the length of the second small segment 22 adjacent to the flexible portion 27 in the drum axial direction.

The flexible portion 27 is a portion that is bent and deformed when the tip end of the sheet-shaped rubber member is held by the first small segment 21 and the second small segment 22 as described later. The deformation is reversible. The flexible portion 27 is made of any material such as a rubber, an epoxy resin, a foam resin, or a sponge. A member made of such a material is fitted into a notch formed on the back surface of the first small segment 21, and is formed as the flexible portion 27.

Figure 4:
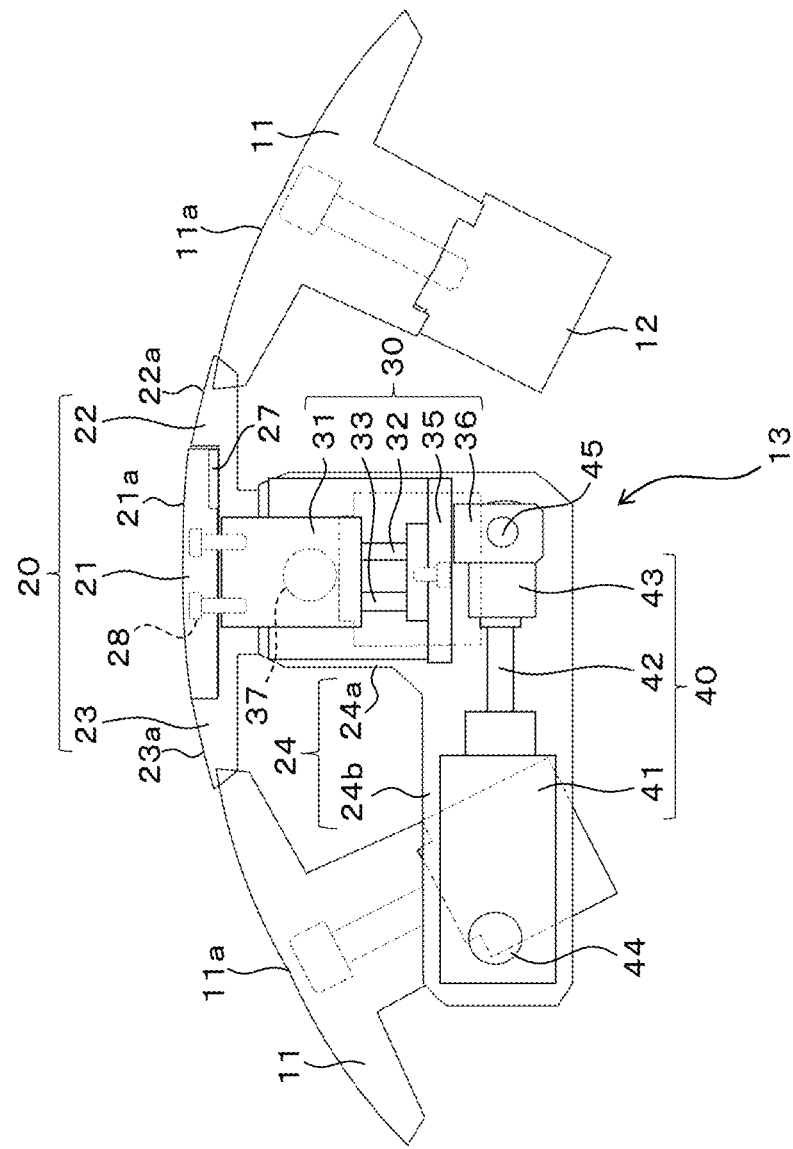
FIG. 4 is a view of a tip-end holding device as seen from the drum axial direction, and is a view when a first small segment is in a backward state.
Figure 7:
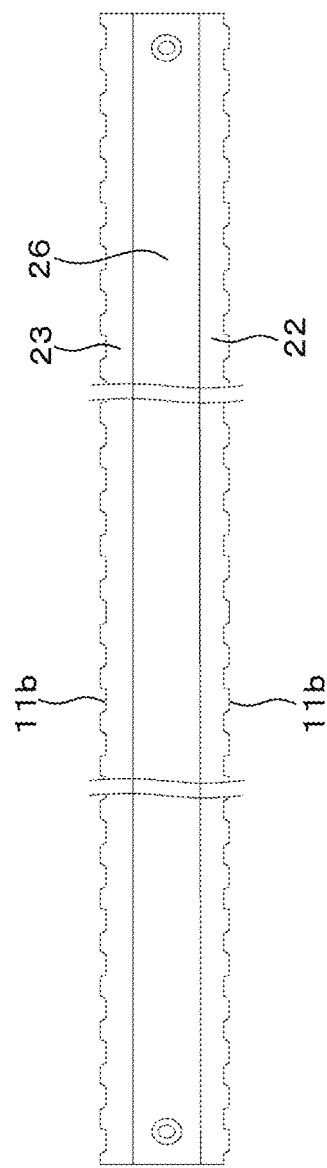
FIG. 7 is a view of a second small segment and a third small segment as seen from the outer side in the drum radial direction, in which a left-right direction is the drum axial direction.
Figure 8:
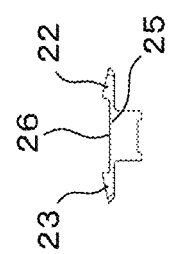
FIG. 8 is a view of the second small segment and the third small segment as seen from the drum axial direction, in which an upper-lower direction is the drum radial direction.

As illustrated in FIGS. 7 and 8 and the like, the second small segment 22 and the third small segment 23 are connected to each other by a connecting portion 25 located inward of the first small segment 21 in the drum radial direction. A recess 26 into which the first small segment 21 is fitted is formed by the second small segment 22, the third small segment 23, and the connecting portion 25. By fitting the first small segment 21 into the recess 26, the outer surfaces 21a, 22a, and 23a of the three small segments 21, 22, and 23 are formed as one curved surface as illustrated in FIG. 4.

The second small segment 22 and the third small segment 23 are movable in the drum radial direction together with other segments 11. The segment driving device 53 that moves the second small segment 22 and the third small segment 23 in the drum radial direction is the same as the segment driving device 53 that moves other segments 11 in the drum radial direction. When the second small segment 22 and the third small segment 23 move together with other segments 11 in the drum radial direction, the first small segment 21 also moves together with the second small segment 22 and the like in the drum radial direction.

The first small segment 21 at the center in the drum circumferential direction is movable with respect to the second small segment 22 and the third small segment 23. Moving devices that move the first small segment 21 are provided on both sides in the drum axial direction.

As illustrated in FIGS. 1 to 4 and the like, the first moving device 30 and a second moving device 40 are provided as the moving devices. The first moving device 30 is a device that moves the first small segment 21 in the drum radial direction. The second moving device 40 is a device that moves the first small segment 21 after being moved outward in the drum radial direction toward the second small segment 22. The first moving device 30 and the second moving device 40 constitute the tip-end holding device 13 together with the tip-end holding segment 20.

As illustrated in FIGS. 1 to 4 and the like, the first moving device 30 and the second moving device 40 are attached to the same single plate 24. The plate 24 has an L shape when viewed from the drum axial direction. The first moving device 30 is attached to a first portion 24a (see FIG. 4) in the plate 24, which is a portion corresponding to one side of the L shape and extending in the drum radial direction. The second moving device 40 is attached to a second portion 24b (see FIG. 4) in the plate 24, which is a portion corresponding to another side of the L shape.

Figure 6:
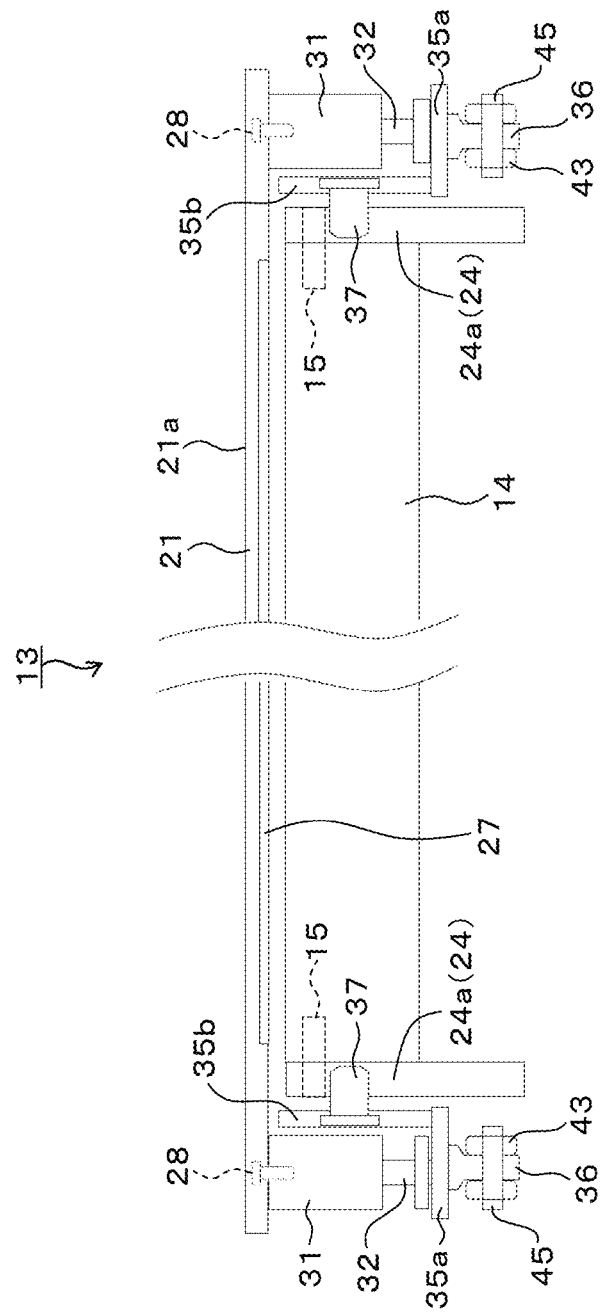
FIG. 6 is a view of the tip-end holding device as seen from a drum circumferential direction (a view as seen from a direction corresponding to an arrow C in FIG. 1), in which a left-right direction is the drum axial direction.

As illustrated in FIGS. 5 and 6, the first portion 24a of the plate 24 is attached, via a bolt 15, to a segment holding member 14 that holds the tip-end holding segment 20. The bolt 15 extends in a direction perpendicular to the plate 24. The plate 24 is attached to an end of the segment holding member 14 in the drum axial direction. The plate 24 can move integrally with the segment holding member 14 in the drum radial direction.

As illustrated in FIG. 4, the plate 24, the first moving device 30, and the second moving device 40 are provided inward of the first small segment 21 in the drum radial direction. The plate 24, the first moving device 30, and the second moving device 40 are provided inward of the outer surfaces 21a, 22a, and 23a of the tip-end holding segment 20 in the drum radial direction when the first small segment 21 is fitted into the above-described recess 26 (when in a backward state to be described later).

The plate 24 is attached to an outer side with respect to the segment holding member 14 in the drum axial direction. The first moving device 30 and the second moving device 40 are attached to a surface on an outer side of the plate 24 in the drum axial direction.

As illustrated in FIG. 4, the first moving device 30 includes a cylinder 31, a rod 32 that moves forward and backward with respect to the cylinder 31, a guide 33 that moves forward and backward together with the rod 32 and that is adjacent to the rod 32, and a fixture 35 to which tip ends of the rod 32 and the guide 33 are fixed. As a part of the first moving device 30, a first connecting member 36 is fixed to a surface on an inner side of the fixture 35 in the drum axial direction.

The rod 32 moves forward and backward by suction and discharge of a fluid such as air on the cylinder 31. The rod 32 and the guide 33 extend in the drum radial direction.

As illustrated in FIG. 6, the fixture 35 includes a first portion 35a that is a plate-shaped portion to which the tip ends of the rod 32 and the guide 33 are fixed, and a second portion 35b that is a plate-shaped portion extending in the same direction as an extending direction of the rod 32 from an inner end of the first portion 35a in the drum axial direction. A longitudinal direction of the rod 32 and the guide 33 is perpendicular to the plate-shaped first portion 35a.

The fixture 35 is located on the outer side with respect to the plate 24 in the drum axial direction. The second portion 35b of the fixture 35 is parallel to the plate 24. The second portion 35b of the fixture 35 and the plate 24 face each other with a slight gap therebetween.

Figure 9:
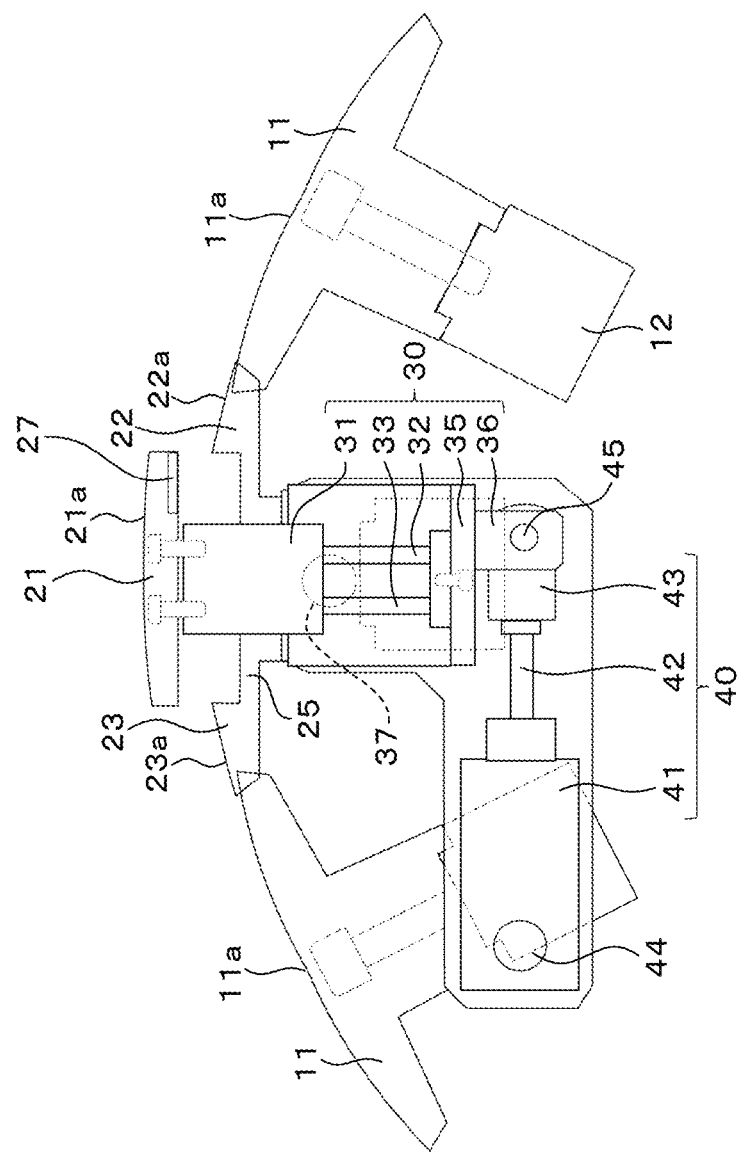
FIG. 9 is a view of the tip-end holding device as seen from the drum axial direction, and is a view when the first small segment moves forward toward the outer side in the drum radial direction.
Figure 10:
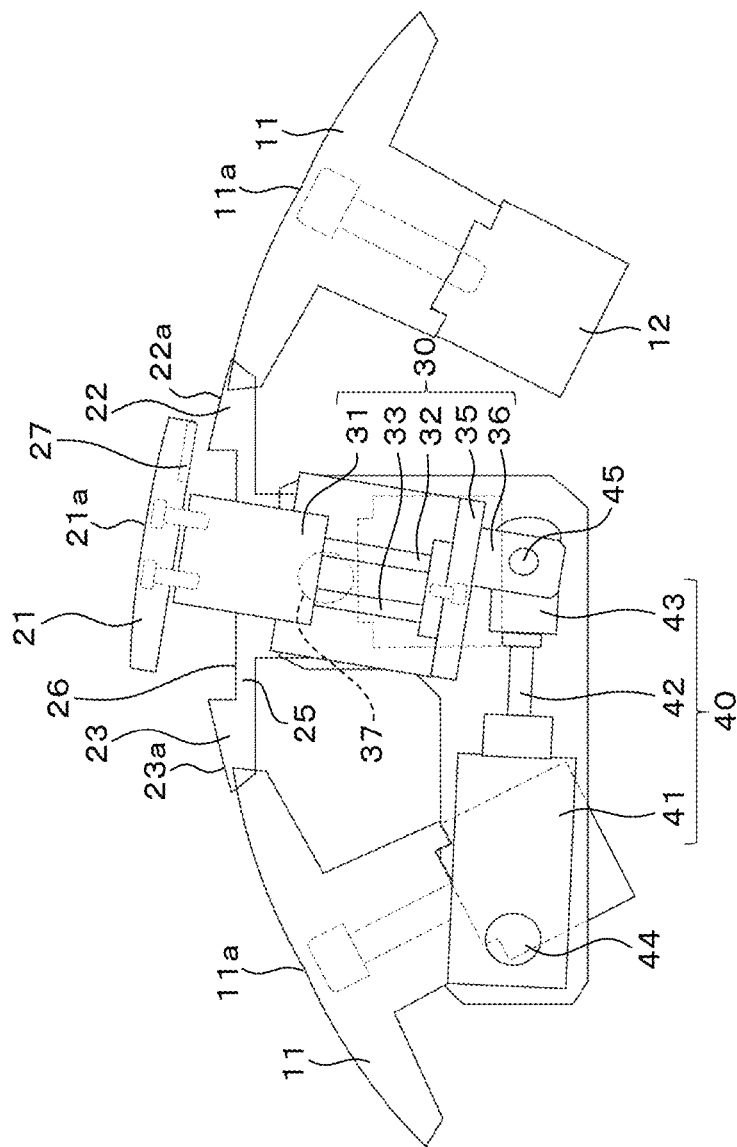
FIG. 10 is a view of the tip-end holding device as seen from the drum axial direction, and is a view when the first small segment moves toward the second small segment.

As illustrated in FIGS. 5 and 6, as a part of the first moving device 30, one shaft 37 protrudes from the second portion 35b of the fixture 35 toward a center of the fixture 35 in the drum axial direction. The shaft 37 is inserted into a hole, which is formed in the plate 24 and extends in the drum axial direction. The fixture 35 and the first moving device 30 fixed to the fixture 35 can change an angle about the shaft 37 on a surface on the outer side of the plate 24 in the drum axial direction. FIGS. 9 and 10 illustrate states in which an angle of the first moving device 30 changes about the shaft 37.

As illustrated in FIGS. 4 and 6, the first small segment 21 is fixed to a surface of the above-described cylinder 31 opposite to the rod 32 and the guide 33. Specifically, the vicinity of an end of the first small segment 21 in the drum axial direction is fixed to the cylinder 31 by bolts 28 each serving as a fixture. The first small segment 21 is perpendicular to the longitudinal direction of the rod 32 and the guide 33. When the rod 32 of the first moving device 30 moves forward and backward, the first small segment 21 fixed to the cylinder 31 moves forward to the outer side in the drum radial direction or moves backward to the inner side in the drum radial direction.

As illustrated in FIG. 9, a state in which the first small segment 21 moves forward and outward of the second small segment 22 and the third small segment 23 in the drum radial direction is set as a forward state of the first small segment 21. As illustrated in FIG. 4, a state in which the outer surface 21a of the first small segment 21 coincides with the outer surfaces 22a and 23a of the second small segment 22 and the third small segment 23 is set as the backward state of the first small segment 21. In the present embodiment, the backward state is referred to as a first state. In the description of the segments and the small segments, when the outer surfaces of the small segments 21, 22, and 23 coincide with each other, and when the outer surfaces of the small segments 21, 22, and 23 coincide with the outer surfaces of the other segments 11, it means that the outer surfaces of these segments are integrated to form one curved surface.

When the first small segment 21 is in the backward state, as illustrated in FIG. 2, the outer surfaces 21a, 22a, and 23a of the three small segments 21, 22, and 23 coincide with the outer surfaces 11a of the other plurality of segments 11. The one curved surface formed at this time has a cylindrical shape and is the outer circumferential surface of the molding drum 10. By forming one cylindrical outer circumferential surface, the cylindrical rubber member can be molded on the outer circumferential surface.

As illustrated in FIGS. 4 and 5, the second moving device 40 includes a cylinder 41, a rod 42 that moves forward and backward with respect to the cylinder 41, and a second connecting member 43 that is fixed to a tip end of the rod 42. The rod 42 moves forward and backward by suction and discharge of a fluid such as air on the cylinder 41.

The cylinder 41 is attached to the plate 24 via a shaft member 44. An angle of the second moving device 40 can be changed about the shaft member 44. FIGS. 9 and 10 illustrate states in which the angle of the second moving device 40 changes about the shaft member 44.

As can be seen from FIG. 4, when viewed from the drum axial direction, the rod 42 of the second moving device 40 has an angle instead of being parallel to the rod 32 of the first moving device 30. The tip end of the rod 42 of the second moving device 40 is movable inward of the rod 32 of the first moving device 30 in the drum axial direction.

The second connecting member 43 provided at the tip end of the rod 42 of the second moving device 40 overlaps the first connecting member 36 of the first moving device 30 in the drum axial direction. A shaft member 45 extending in the drum axial direction passes through the overlapping portion. Accordingly, the first connecting member 36 and the second connecting member 43 are connected to each other. A portion including the first connecting member 36, the second connecting member 43, and the shaft member 45 is a knuckle joint. When the rod 42 of the second moving device 40 moves forward and backward, the knuckle joint moves in a forward and backward direction of the rod 42.

The rod 42 of the second moving device 40 moves forward and backward when the first small segment 21 is in the forward state. When the rod 42 of the second moving device 40 moves forward and backward, a direction of the first moving device 30 changes, and the first small segment 21 moves.

Specifically, first, as a first stage, the first small segment 21 is in the forward state, and the rod 42 of the second moving device 40 is in the forward state (that is, in a state in FIG. 9). At this time, the longitudinal direction of the rod 32 of the first moving device 30 is the drum radial direction.

Next, as a second stage, as illustrated in FIG. 10, the rod 42 of the second moving device 40 moves backward, and a distance from the cylinder 41 to the second connecting member 43 is shortened. Then, the first connecting member 36 of the first moving device 30 is pulled toward the cylinder 41 of the second moving device 40 by the rod 42 of the second moving device 40. When the first connecting member 36 is pulled, the entire first moving device 30 is inclined at a predetermined angle about the shaft 37. At this time, an inner portion of the first moving device 30 in the drum radial direction moves in a direction toward the cylinder 41 of the second moving device 40, and an outer portion of the first moving device 30 in the drum radial direction moves in a direction toward the second small segment 22. Since the first moving device 30 is inclined in this manner, the first small segment 21 attached to the outer portion of the first moving device 30 in the drum radial direction moves toward the second small segment 22.

After the second stage, when the rod 42 of the second moving device 40 moves forward again, the first connecting member 36 of the first moving device 30 is pressed by the rod 42 of the second moving device 40, and the entire first moving device 30 is inclined at the predetermined angle about the shaft 37. The first moving device 30 is inclined, so that a position of the first small segment 21 returns to a position illustrated in FIG. 9.

As illustrated in FIG. 9, when the first small segment 21 is in the forward state and the rod 42 of the second moving device 40 is in the forward state, the first small segment 21 is disposed at a position outside the connecting portion 25 between the second small segment 22 and the third small segment 23 in the drum radial direction. At this time, the first small segment 21 has the same height as that of both the second small segment 22 and the third small segment 23. This state is referred to as a standing state of the first small segment 21.

As illustrated in FIG. 10, when the first small segment 21 is in the forward state and the rod 42 of the second moving device 40 is in the backward state, the first small segment 21 is inclined toward the second small segment 22 as compared with that in the standing state. A portion of the first small segment 21 is disposed outward of the second small segment 22 in the drum radial direction. At this time, the flexible portion 27 on the back surface of the first small segment 21 faces the outer surface 22a of the second small segment 22. Here, facing means that a perpendicular line drawn from the outer surface 22a of the second small segment 22 intersects with the flexible portion 27 of the first small segment 21.

Accordingly, a state in which the first small segment 21 in the forward state is inclined and the flexible portion 27 faces the outer surface 22a of the second small segment 22 is set as the inclined state of the first small segment 21. In the present embodiment, the inclined state is referred to as a second state. When the first small segment 21 is in the inclined state, an interval between the flexible portion 27 of the first small segment 21 and the outer surface 22a of the second small segment 22 is, for example, 10 mm or more and 15 mm or less. Here, the interval refers to a length in a direction perpendicular to the outer surface 22a of the second small segment 22.

Figure 11:
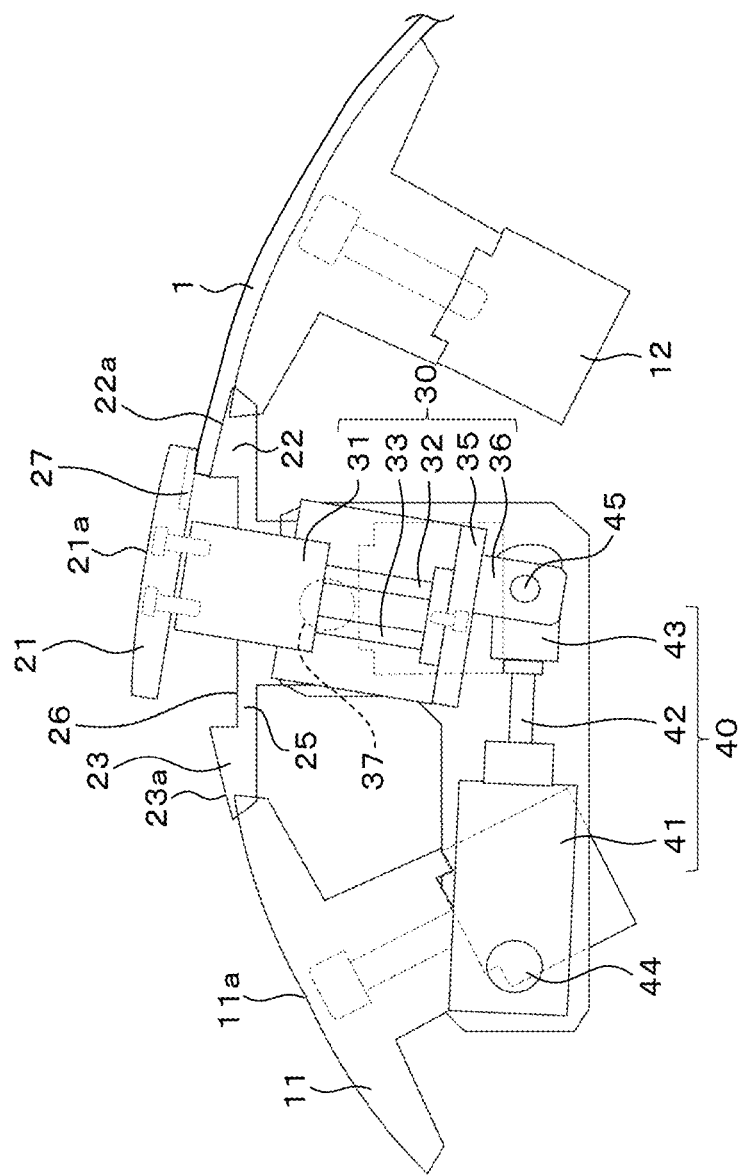
FIG. 11 is a view of the tip-end holding device as seen from the drum axial direction, and is a view when a sheet-shaped rubber member is sandwiched between the first small segment and the second small segment.

When the first small segment 21 is in the inclined state, as illustrated in FIG. 11, a tip end of a sheet-shaped rubber member 1 can be sandwiched between the flexible portion 27 of the first small segment 21 and the outer surface 22a of the second small segment 22. When the tip end of the sheet-shaped rubber member 1 is sandwiched, the flexible portion 27 of the first small segment 21 is deformed. Due to an elastic force generated from the deformation of the flexible portion 27, the tip end of the sheet-shaped rubber member 1 is firmly held by the flexible portion 27 and the outer surface 22a of the second small segment 22.

As illustrated in FIG. 6, the first moving device 30, the second moving device 40, and the plate 24 to which the first moving device 30 and the second moving device 40 are attached are provided on both sides in the drum axial direction. The first moving device 30, the second moving device 40, and the plate 24 are plane symmetrical with respect to a plane that passes through a center position of the molding drum 10 in an axial direction and that is orthogonal to the drum axial direction.

Figure 12:
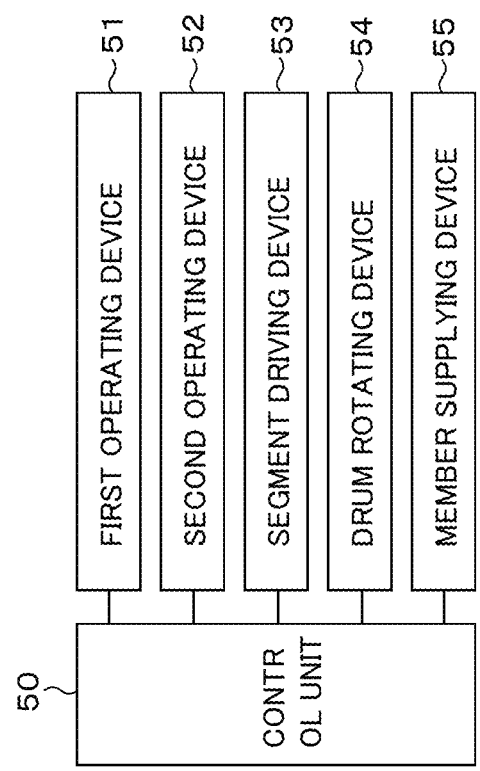

Operations of the molding drum 10 are controlled by a control unit 50. As illustrated in FIG. 12, at least a first operating device 51, a second operating device 52, the segment driving device 53, a drum rotating device 54, and a member supplying device 55 are connected to the control unit 50. The first operating device 51, the second operating device 52, the segment driving device 53, and the drum rotating device 54 are parts of the molding drum 10.

The first operating device 51 is a device that changes the amount of fluid in the cylinder 31 in order to move the rod 32 of the first moving device 30 forward and backward. The first operating device 51 simultaneously operates the first moving devices 30 on both sides in the drum axial direction. The second operating device 52 is a device that changes the amount of fluid in the cylinder 41 in order to move the rod 42 of the second moving device 40 forward and backward. The second operating device 52 simultaneously operates the second moving devices 40 on both sides in the The drum rotating device 54 is a device having a known structure for rotating the molding drum 10, and includes, for example, a motor. The member supplying device 55 is a device that supplies the sheet-shaped rubber member to the molding drum 10.

As the sheet-shaped rubber member wound around the molding drum 10, various sheet-shaped rubber members for a tire can be exemplified. Examples of the sheet-shaped rubber member include one sheet-shaped rubber member such as an inner liner or a belt. Examples of another sheet-shaped rubber member include a sheet-shaped rubber member in which a plurality of sheet-shaped members are bonded, such as a temporary assembly in which a chafer and a sidewall rubber are attached to both sides of the inner liner in a width direction, respectively. On each of the both sides in the drum axial direction, one sheet-shaped rubber member can also be simultaneously wound. Examples of the sheet-shaped rubber member to be simultaneously wound on both sides in the drum axial direction include a chafer or a sidewall rubber.

Figure 13:
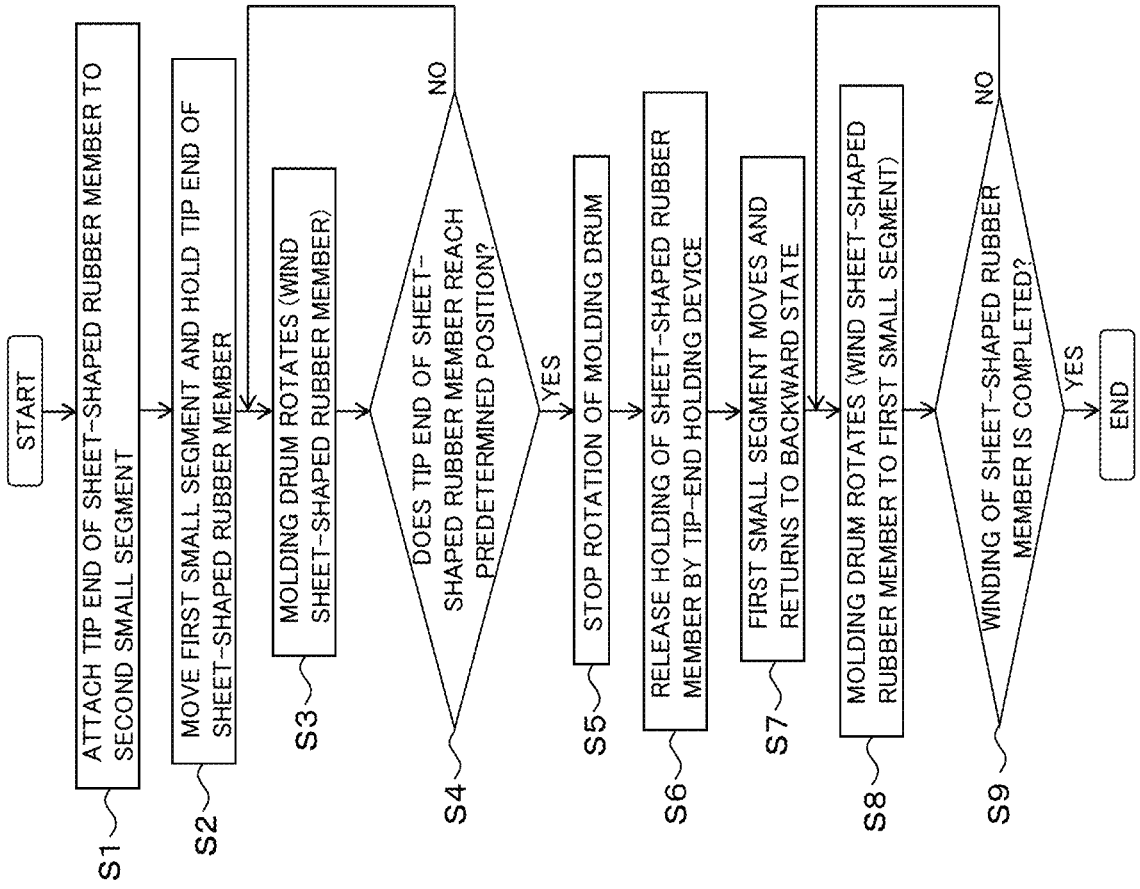
FIG. 13 is a flowchart illustrating molding of a cylindrical rubber member.

The sheet-shaped rubber member is wound around the outer circumferential surface of the molding drum 10 having the above configuration, and the cylindrical rubber member is molded. A length of the sheet-shaped rubber member is substantially the same as a circumference of the molding drum 10. The molding in the molding drum 10 is performed under control of the control unit 50. A molding process is illustrated in FIG. 13.

Figure 14:
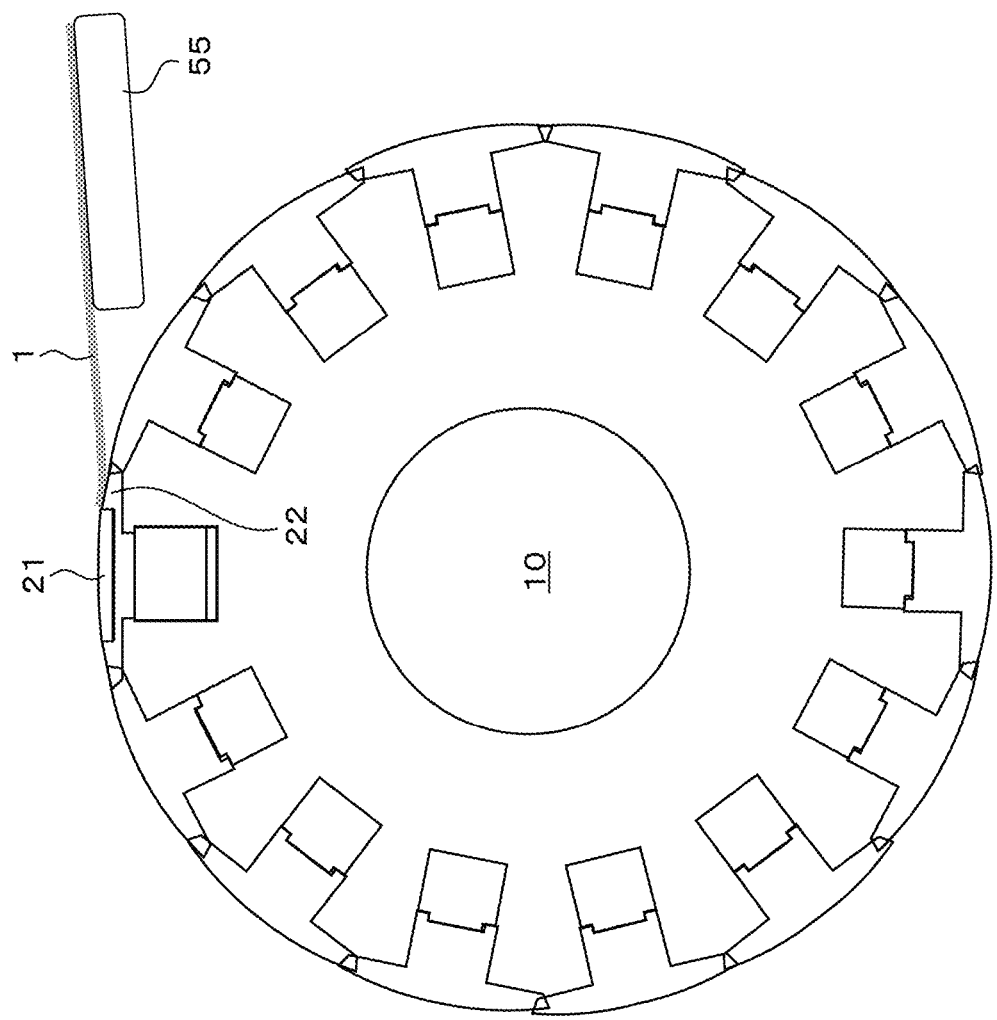
FIG. 14 is a view illustrating a method for winding the sheet-shaped rubber member around the molding drum, and is a view illustrating a state when the sheet-shaped rubber member is attached to the second small segment.

Specifically, first, the member supplying device 55 that supplies the sheet-shaped rubber member 1 to the molding drum 10 approaches the molding drum 10. Then, the tip end of the sheet-shaped rubber member 1 supplied from the member supplying device 55 is attached to the second small segment 22 of the molding drum 10 (S1 in FIG. 13, and FIG. 14). The sheet-shaped rubber member 1 is attached to the outer surface 22a of the second small segment 22 by an adhesive force thereof. At this time, it is preferable that an edge of the farthest tip end of the sheet-shaped rubber member 1 coincides with or is close to a boundary between the first small segment 21 and the second small segment 22. At this time, the first small segment 21 is in the backward state.

Next, the first moving device 30 is operated, so that the first small segment 21 is in the forward state (standing state) (see FIG. 9). Next, the second moving device 40 is operated, so that the first small segment 21 is inclined toward the second small segment 22 and is in the inclined state (see FIG. 10).

Figure 15:
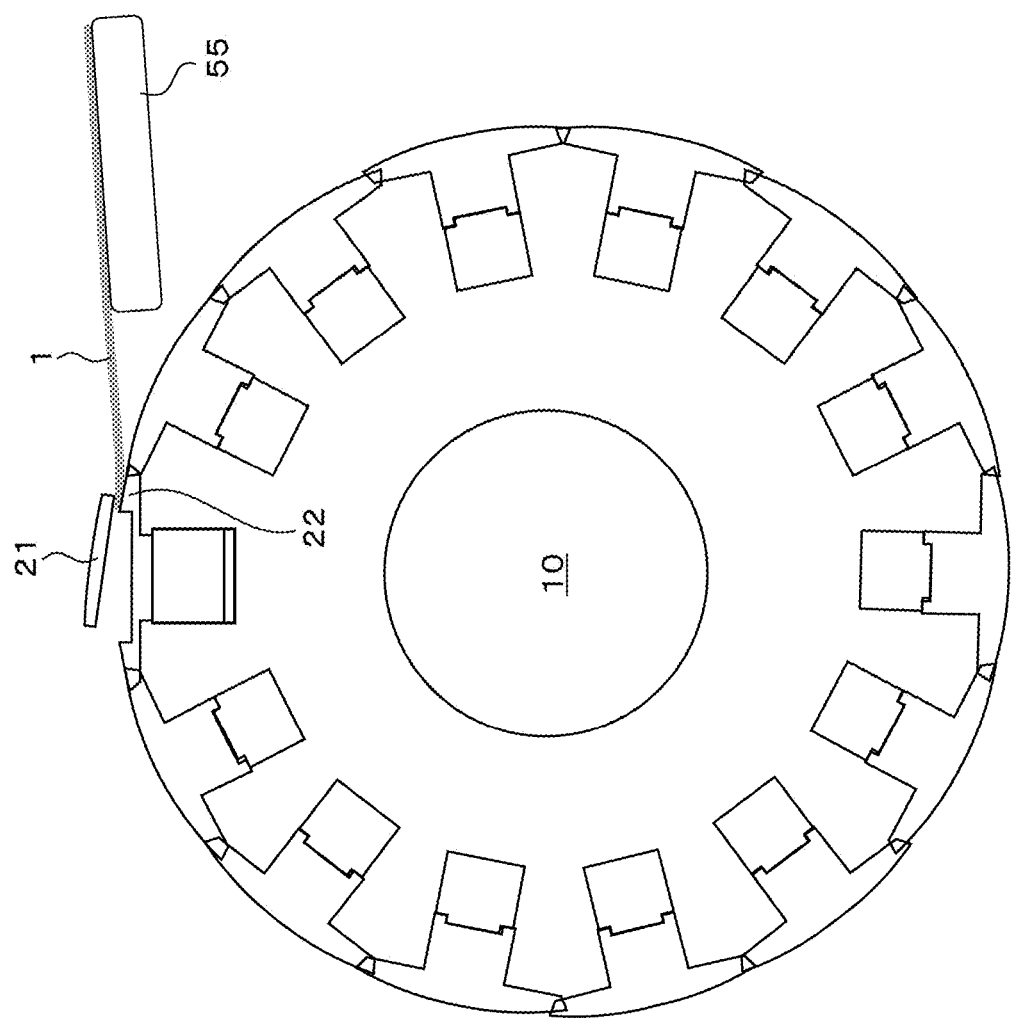
FIG. 15 is a view illustrating the method for winding the sheet-shaped rubber member around the molding drum, and is a view illustrating a state when the tip-end holding device holds the sheet-shaped rubber member.

When the first small segment 21 is in the inclined state, the tip end of the sheet-shaped rubber member 1 is sandwiched between the flexible portion 27 on the back surface of the first small segment 21 and the outer surface 22a of the second small segment 22. Accordingly, the tip-end holding device 13 holds the tip end of the sheet-shaped rubber member 1 (S2 in FIG. 13, and FIG. 15).

After the tip-end holding device 13 holds the tip end of the sheet-shaped rubber member 1, the molding drum 10 starts to rotate (S3 in FIG. 13). During the rotation of the molding drum 10, the tip-end holding device 13 continues holding the tip end of the sheet-shaped rubber member 1. The rotation of the molding drum 10 causes the sheet-shaped rubber member 1 to be wound around the molding drum 10.

Figure 16:
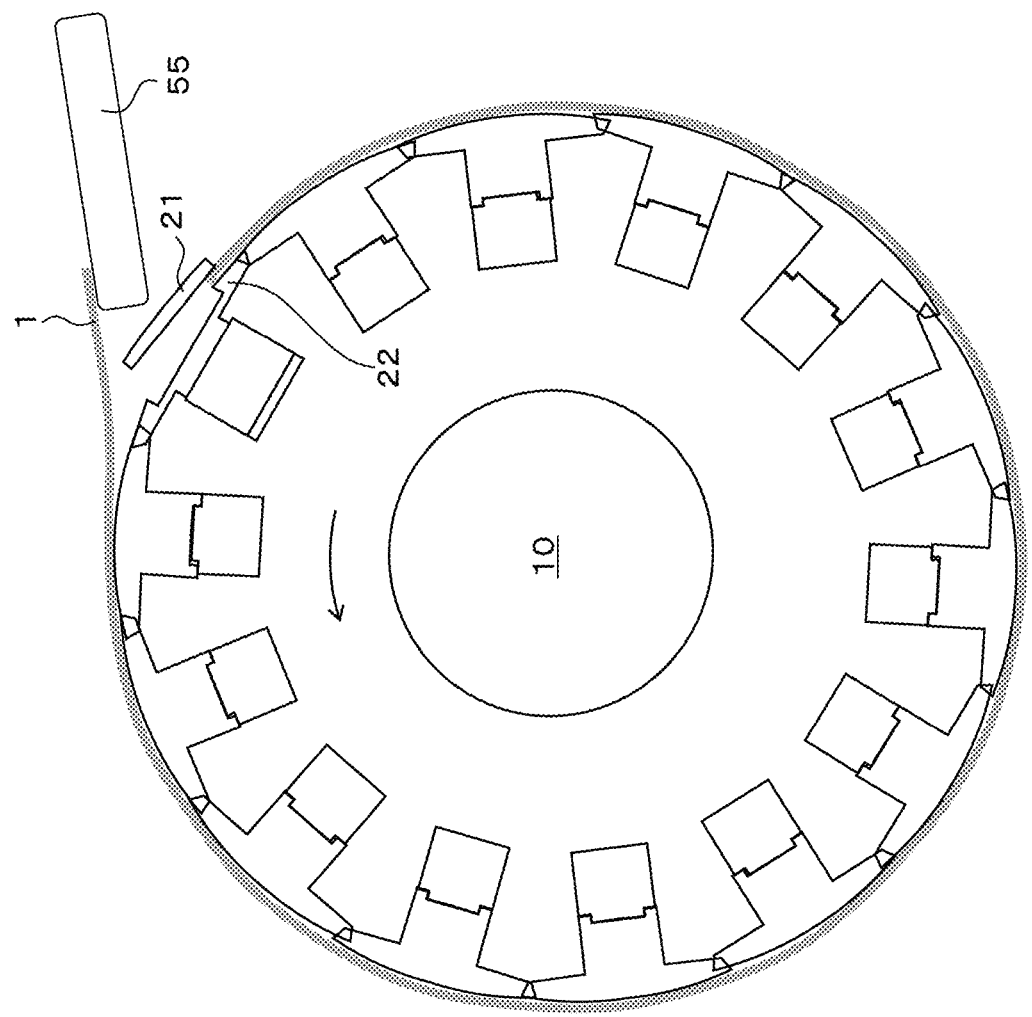
FIG. 16 is a view illustrating the method for winding the sheet-shaped rubber member around the molding drum, and is a view illustrating a state when the molding drum rotates about one round and stops.

When the molding drum 10 rotates about one round and the tip end of the sheet-shaped rubber member 1 reaches a predetermined position (YES in S4 in FIG. 13), the rotation of the molding drum 10 is stopped (S5 in FIG. 13, and FIG. 16). At this time, the sheet-shaped rubber member 1 is wound around substantially the entire outer circumferential surface of the molding drum 10, but is not attached to the outer surface 21a of the first small segment 21.

After the rotation of the molding drum 10 is stopped, the second moving device 40 is operated, so that the first small segment 21 returns to the standing state (see FIG. 9). Accordingly, the first small segment 21 is separated from the sheet-shaped rubber member 1, and the holding of the sheet-shaped rubber member 1 by the tip-end holding device 13 is released (S6 in FIG. 13).

Figure 17:
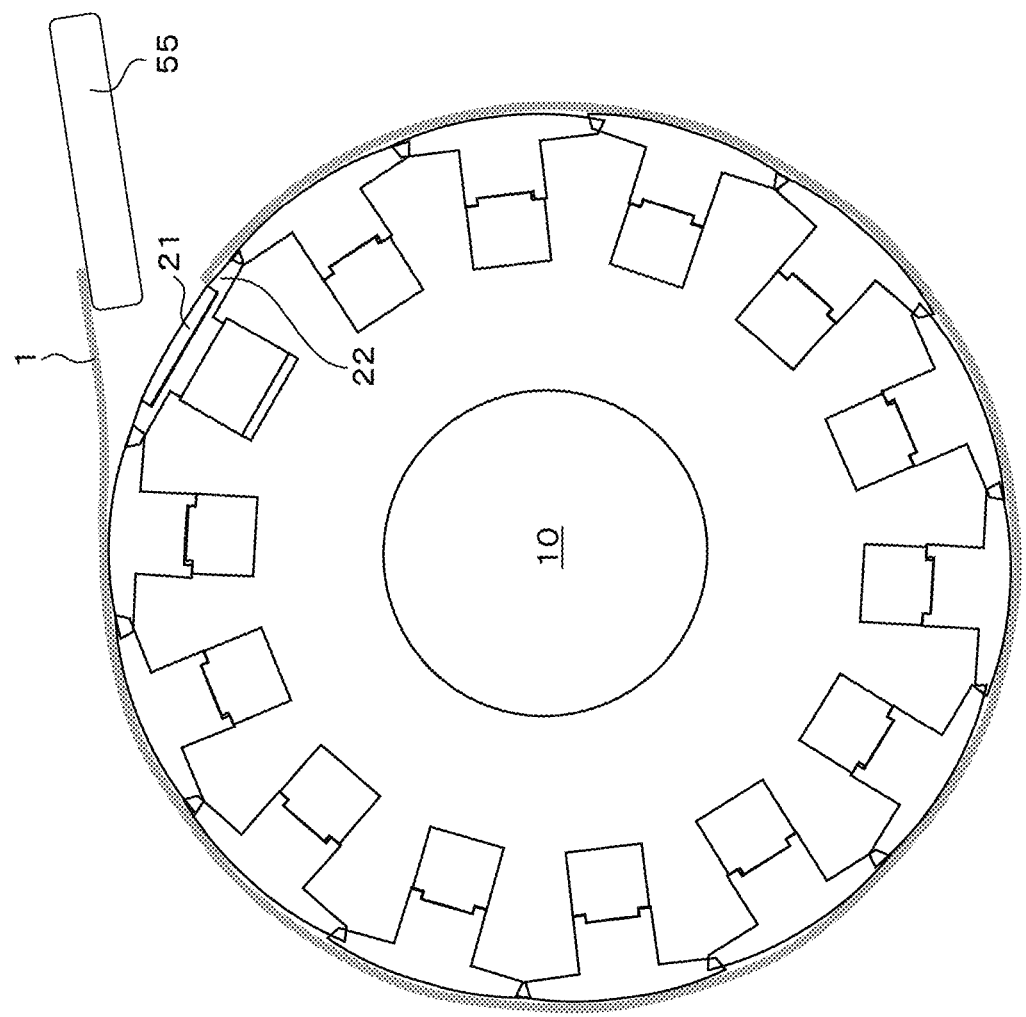
FIG. 17 is a view illustrating the method for winding the sheet-shaped rubber member around the molding drum, and is a view illustrating a state when the first small segment returns to the backward state.

Next, the first moving device 30 is operated, so that the first small segment 21 returns to the backward state (S7 in FIG. 13, and FIG. 17). Accordingly, the outer surface 21a of the first small segment 21 coincides with the outer surface 22a of the second small segment 22 and the outer surface 23a of the third small segment 23.

Figure 18:
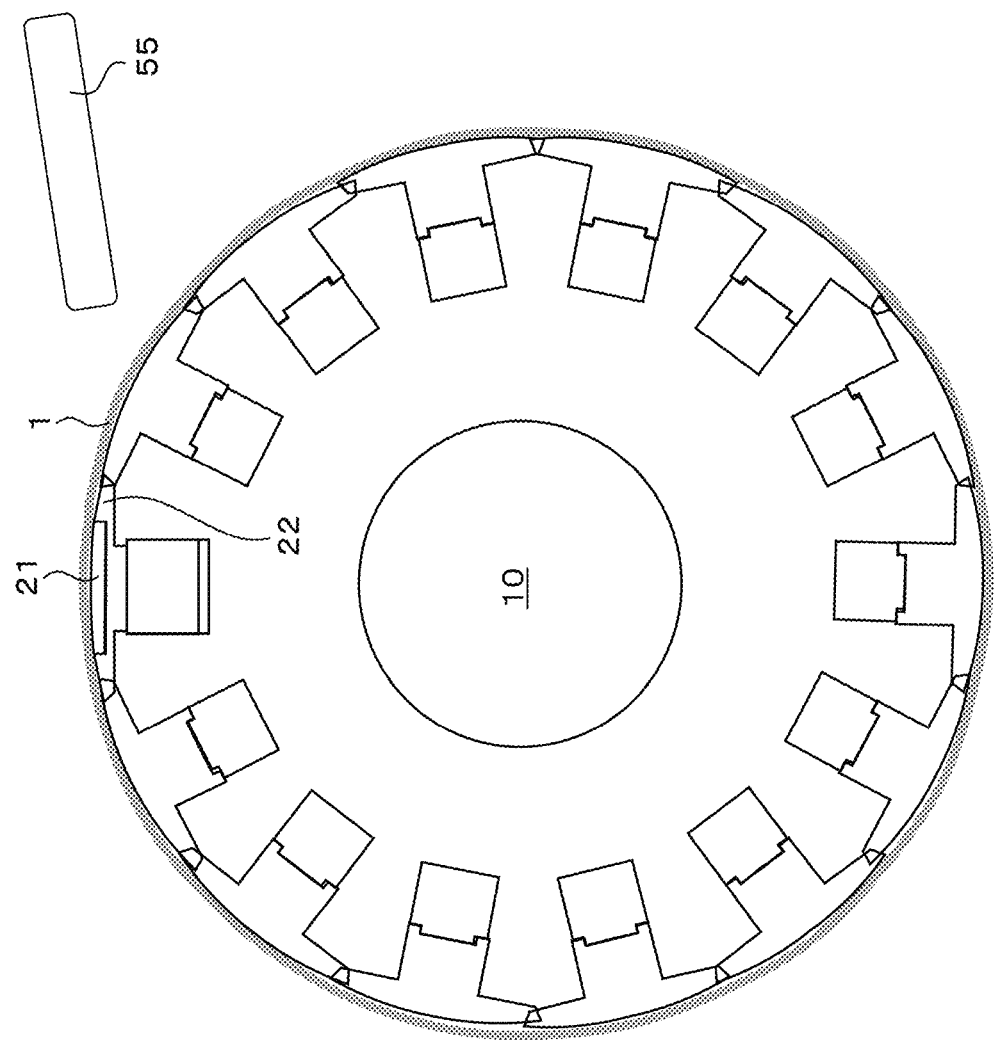
FIG. 18 is a view illustrating the method for winding the sheet-shaped rubber member around the molding drum, and is a view illustrating a state when the molding drum rotates again and the sheet-shaped rubber member is attached to the first small segment.

After the first small segment 21 returns to the backward state, the molding drum 10 rotates again. By the rotation, the sheet-shaped rubber member 1 is also attached to the outer surface 21a of the first small segment 21 (S8 in FIG. 13, and FIG. 18).

When the sheet-shaped rubber member 1 is wound up to the end (YES in S9 in FIG. 13), a rear end of the sheet-shaped rubber member 1 coincides with a front end or overlaps the front end. When the sheet-shaped rubber member 1 is wound up to the end, the molding of the cylindrical rubber member is completed. The completed cylindrical rubber member is sent to a subsequent step and used as a part of the pneumatic tire.

Such a molding drum 10 can prevent deviation of the tip end of the sheet-shaped rubber member even though a size of the molding drum 10 is not increased. Specifically, the molding drum 10 includes the first small segment 21 and the second small segment 22 as small segments arranged in the drum circumferential direction. The first small segment 21 can take the first state (backward state) in which the second small segment 22 coincides with the outer surface of the first small segment 21, and the second state (inclined state) in which a portion of the first small segment 21 is located outward of the second small segment 22 in the drum radial direction. In the second state, the tip end of the sheet-shaped rubber member is sandwiched between the first small segment 21 and the second small segment 22.

Since the tip end of the sheet-shaped rubber member can be sandwiched in this manner, the deviation of the tip end of the sheet-shaped rubber member can be prevented. Here, since members that sandwich the tip end of the sheet-shaped rubber member are, instead of a device provided outward of the outer circumferential surface of the molding drum 10 in the drum radial direction or the like, the first small segment 21 and the second small segment 22 of the tip-end holding segment 20 which is also one of the segments, the size of the molding drum 10 is not increased. Accordingly, the molding drum 10 can prevent the deviation of the tip end of the sheet-shaped rubber member even though the size of the molding drum 10 is not increased.

Since the tip-end holding segment 20 is divided into the first small segment 21 and the second small segment 22 over the entire drum axial direction, it is possible to hold a sheet-shaped rubber member having a narrow width as well as a sheet-shaped rubber member having a wide width. It is also possible to hold a sheet-shaped rubber member having a wide width in which a plurality of sheet-shaped members are bonded.

Since the portion of the first small segment 21 facing the outer surface 22a of the second small segment 22 when the first small segment 21 is in the second state (inclined state) is formed as the flexible portion 27, the tip end of the sheet-shaped rubber member can be firmly held by the flexible portion 27 and the outer surface 22a of the second small segment 22. Therefore, it is possible to prevent the deviation of the tip end of the sheet-shaped rubber member.

Since the first moving device 30 and the second moving device 40 that move the first small segment 21 are disposed inward of the first small segment 21 in the drum radial direction, the size of the molding drum 10 is not increased. With such a disposition, even if the first moving device 30 and the second moving device 40 rotate integrally with the segments 11 or the like, problems such as coming into contact with members around the molding drum 10 do not arise.

As the moving devices that move the first small segment 21, the first moving device 30 that moves the first small segment 21 in the drum radial direction and the second moving device 40 that inclines the first small segment 21 after being moved outward in the drum radial direction toward the second small segment 22 are provided. Therefore, it is possible to implement two-stage operations in which the first small segment 21 is moved in the drum radial direction and set as the standing state (forward state), and in which the first small segment 21 in the standing state is inclined toward the second small segment 22 and set as the inclined state. By the two-stage operations, the tip end of the sheet-shaped rubber member on the outer surface 22a of the second small segment 22 can be reliably pressed by the first small segment 21 from the outer side in the drum radial direction.

Since the first moving device 30 and the second moving device 40 operate with the fluid such as air, it is easy to adjust magnitude of a force for pressing the sheet-shaped rubber member by the first small segment 21.

Since the first moving device 30 and the second moving device 40 are provided on both sides of the first small segment 21 in the drum axial direction, the first small segment 21 can be simultaneously operated by the devices on both sides in the drum axial direction. Accordingly, even if the first small segment 21 is long in the drum axial direction, the entire first small segment 21 can be reliably moved.

Since the outer surface 22a of the second small segment 22, which is the surface to which the tip end of the sheet-shaped rubber member is initially attached, is a smooth surface made of metal rather than a flexible surface or the like, the tip end of the sheet-shaped rubber member is easily stuck to the outer surface 22a of the second small segment 22.

Various modifications can be made to the above-described embodiment. Any one of modifications to be described below may be applied to the above-described embodiment, or any two or more of the modifications may be combined and applied to the above-described embodiment. The combination can be freely performed within a range in which no technical contradiction occurs.

Modification 1

A flexible portion may also not be provided in any portion of a first small segment and a second small segment, including a back surface of the first small segment. Even if there is no flexible portion, a tip end of a sheet-shaped rubber member can be held by the back surface of the first small segment and an outer surface of the second small segment.

Modification 2

A portion of an outer surface of a second small segment, which faces a first small segment in an inclined state, may be formed as a flexible portion. In this case, the same flexible portion as in the above-described embodiment may be provided on a back surface of the first small segment, or the flexible portion may not be provided on the back surface of the first small segment. Even when the outer surface of the second small segment is formed as the flexible portion, a tip end of a sheet-shaped rubber member can be firmly held.

Modification 3

A flexible portion may be formed by applying a liquid containing a resin or the like to a predetermined portion of the first small segment 21.

Modification 4

A portion that comes into contact with a sheet-shaped rubber member when a tip end of the sheet-shaped rubber member is held is not limited to a back surface of a first small segment and an outer surface of a second small segment.

A second state may be implemented in which at least a portion of the first small segment moves to a position outward of the second small segment in a drum radial direction, and in the second state, it is sufficient that the tip end of the sheet-shaped rubber member is sandwiched between any portion of the first small segment and any portion of the second small segment.

Modification 5

A first moving device and a second moving device that move a first small segment are not limited to those using a cylinder as in the above-described embodiment. The first moving device and the second moving device may be any device as long as the first moving device and the second moving device can move the first small segment. For example, the first moving device and the second moving device may use a motor.

Modification 6

A first moving device and a second moving device that move a first small segment may be provided on only one side in a drum axial direction. It is sufficient that the first moving device and the second moving device on only one side in the drum axial direction can move the first small segment.

Modification 7

A moving device that moves a first small segment does not need to be divided into a first moving device and a second moving device as in the above-described embodiment, and may be one device. It is sufficient for the first small segment to take, by operations of one moving device, a first state in which an outer surface of the first small segment coincides with an outer surface of a second small segment and a second state in which at least a portion of the first small segment is located at a position outward of the second small segment in a drum radial direction.

Modification 8

Figure 19:
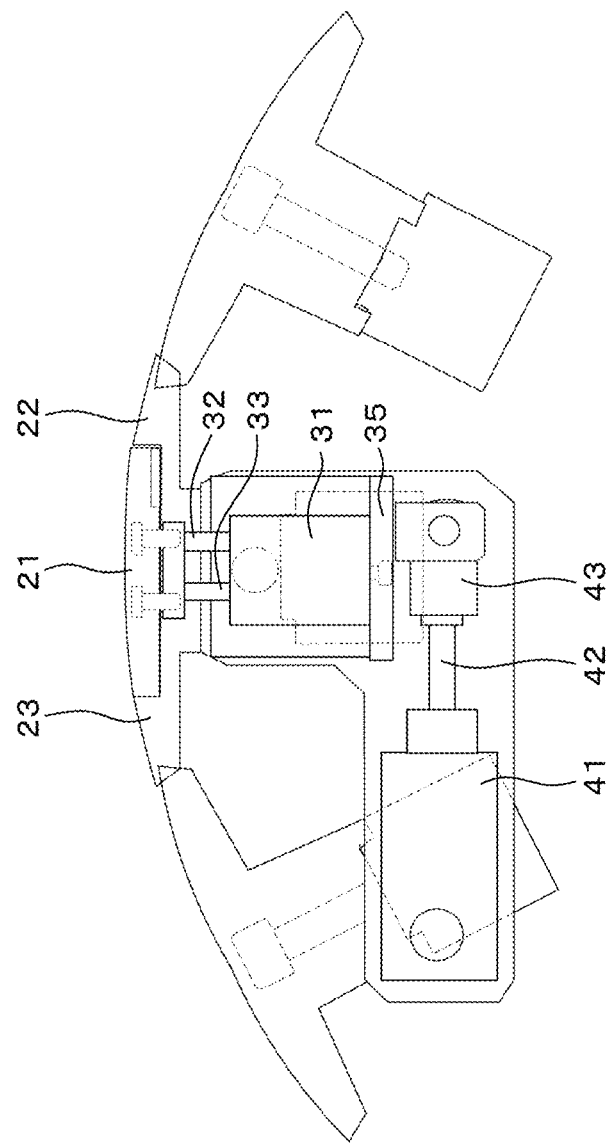
FIG. 19 is a view of a tip-end holding device according to a modification as seen from a drum axial direction.

A positional relationship between the cylinder 31 and the rod 32 of the first moving device 30 may be opposite to that according to the above-described embodiment. Specifically, as illustrated in FIG. 19, the rod 32 of the first moving device 30 may be located on an outer side with respect to the cylinder 31 in a drum axial direction, and the first small segment 21 may be fixed to a tip end of the rod 32. At this time, the first small segment 21 may be fixed to the rod 32 with another member interposed therebetween.

Modification 9

A molding process of a cylindrical rubber member may be different from that according to the above-described embodiment. For example, after a tip end of the sheet-shaped rubber member 1 is attached to the second small segment 22 of the molding drum 10, the molding drum 10 may be rotated by a slight angle (this rotation is referred to as "small rotation"), and the sheet-shaped rubber member 1 may be slightly wound. In this case, after the small rotation, the rotation of the molding drum 10 is temporarily stopped, and while the rotation of the molding drum 10 is stopped, the tip-end holding device 13 holds the tip end of the sheet-shaped rubber member 1. Thereafter, the molding drum 10 restarts to rotate and winds up a remaining portion of the sheet-shaped rubber member 1.

Modification 10

An operation of sandwiching a tip end of a sheet-shaped rubber member between the first small segment 21 and the second small segment 22 is not limited to the operation according to the above-described embodiment.

Figure 20:
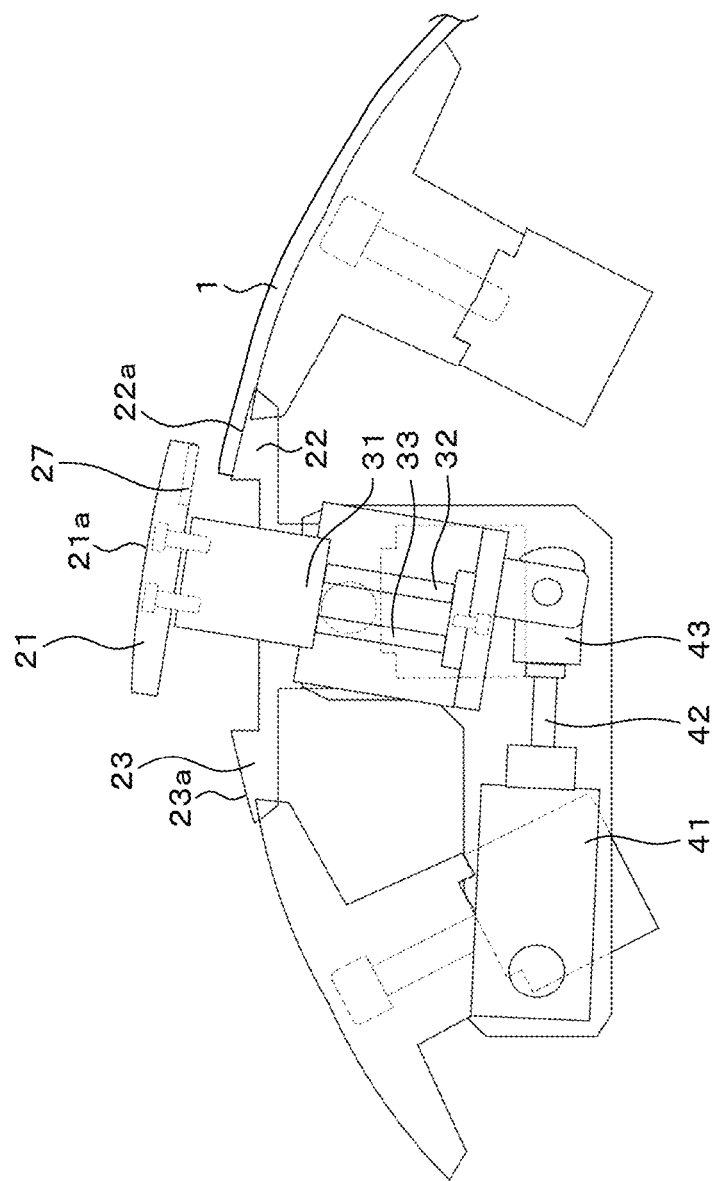
FIG. 20 is a view illustrating a state when a first small segment does not come into contact with a sheet-shaped rubber member even when the first small segment is in an inclined state according to the modification.

In the present modification, first, the tip end of the sheet-shaped rubber member is attached to the outer surface 22a of the second small segment 22. Next, the first moving device 30 is operated, so that the first small segment 21 is in the forward state (standing state) (see FIG. 9). Next, when the second moving device 40 is operated, the first small segment 21 is inclined toward the second small segment 22 and is in an inclined state. Two-stage operations of the first small segment 21 up to this point are the same as those when the tip end of the sheet-shaped rubber member is sandwiched between the first small segment 21 and the second small segment 22 in the above-described embodiment. However, as illustrated in FIG. 20, in the present modification, at a time point when the first small segment 21 is in the inclined state, the first small segment 21 does not come into contact with the sheet-shaped rubber member.

In the present modification, after the first small segment 21 is in the inclined state, as third-stage operations, the first moving device 30 operates and the first small segment 21 moves slightly backward to an inner side in a drum radial direction. When the first small segment 21 moves slightly backward, the tip end of the sheet-shaped rubber member is sandwiched between the first small segment 21 and the second small segment 22 (see FIG. 11).

In the present modification, the tip end of the sheet-shaped rubber member is also firmly held between the first small segment 21 and the second small segment 22.

Modification 11

A plurality of the tip-end holding segments 20 may be provided in one molding drum 10. In this case, the plurality of tip-end holding segments 20 may be disposed at equal intervals in a drum circumferential direction.

REFERENCE SIGNS LIST

1: sheet-shaped rubber member
10: molding drum
11: segment
11a: outer surface
11b: concave and convex portion
12: segment holding member
13: tip-end holding device
14: segment holding member
15: bolt
20: tip-end holding segment
21: first small segment
21a: outer surface
22: second small segment
22a: outer surface
23: third small segment
23a: outer surface
24: plate
24a: first portion
24b: second portion
25: connecting portion
26: recess
27: flexible portion
28: bolt
30: first moving device
31: cylinder
32: rod
33: guide
35: fixture
35a: first portion
35b: second portion
36: first connecting member
37: shaft
40: second moving device
41: cylinder
42: rod
43: second connecting member
44: shaft member
45: shaft member
50: control unit
51: first operating device
52: second operating device
53: segment driving device
54: drum rotating device
55: member supplying device

What is claimed is:

1. A molding drum in which a sheet-shaped rubber member for a tire is wound around an outer circumferential surface having a cylindrical shape, wherein
   a plurality of segments are arranged in a drum circumferential direction, and the outer circumferential surface of the molding drum is formed by outer circumferential surfaces of the segments coinciding with each other,
   at least one of the plurality of segments is a tip-end holding segment,
   the tip-end holding segment includes at least a first small segment and a second small segment that are arranged in the drum circumferential direction, the first small segment and the second small segment each having an outer circumferential surface circumferentially smaller than each of the outer circumferential surfaces of the plurality of segments,
   the first small segment can take a first state in which the outer circumferential surface of the first small segment coincides with the outer circumferential surface of the second small segment to form the outer circumferential surface of the molding drum, and a second state in which at least a portion of the first small segment is disposed outward of the second small segment in a drum radial direction, and
   a first moving device configured to move the first small segment in the drum radial direction and a second moving device configured to move the first small segment, after being moved outward in the drum radial direction, toward the second small segment are provided as moving devices configured to move the first small segment from the first state to the second state.

* * * * *